United States Patent Office 3,713,936
Patented Jan. 30, 1973

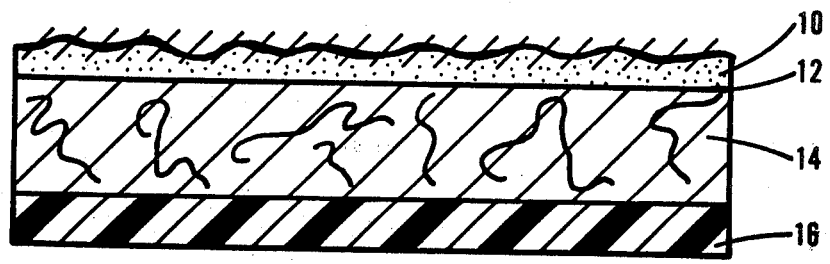

3,713,936
FABRIC MOLDING
Alston Ramsay, Jr., Charlotte, N.C., assignor to Celanese Corporation, New York, N.Y.
Original application Aug. 12, 1968, Ser. No. 751,778. Divided and this application Feb. 1, 1971, Ser. No. 111,652
Int. Cl. B24c 5/00
U.S. Cl. 156—242
1 Claim

ABSTRACT OF THE DISCLOSURE

Laminates comprising an internal batting, a first outer layer of a fabric having sufficient directional stretchability to conform to a molded shape and a second outer layer of a particulate thermoplastic fusible into a tough, stiff backing may be molded into rigid, strong, three dimensional fabric articles having a permanent resistance to shape deformation.

---

This application is a divisional of U.S. application Ser. No. 751,778, filed Aug. 12, 1968 and now abandoned.

BACKGROUND OF THE INVENTION

This invention relates to the preparation of three-dimensional, molded, fabric-containing structures. More particularly, the invention relates to molded fabric laminates characterized by the high degree of form retention, dimensional stability and strength required in rigid, three-dimensional, and particularly acute-angles and steeply-sloped, molded textile structures subjected to considerable stress and strain during normal use. The products of the present invention retain their original shape, resisting compaction, surface deformation, overall dimensional change and the like, for indefinite periods of time.

Prior to the present invention, numerous methods have been suggested in the art for preparing molded fabric articles, such as interior liners for suitcases, briefcases and caskets; seats and supporting structures for use in chairs, sofas and automobiles; and various other related end uses. Prior art procedures have not been commercially successful in enabling the production of essentially rigid articles possessing the appearance, resiliency and loft of a fabric in combination with the durability, dimensional stability and general resistance to externally induced changes in physical form of high impact strength molded thermoplastics.

Flat fabrics are generally molded into three-dimensional shapes in female molds of various configurations having an open side across which the fabric is tautly secured. Subsequently, during hot or cold pressure molding, the male die forces the fabric into the mold to conform to the mold configuration causing bi-directional stretching in the fabric. With the employment of such a technique to form strong, molded laminated fabrics resistant to shape deforming forces while retaining fabric characteristics, the various plies or layers must be capable of synchronously stretching or flowing under ambient or elevated temperature and pressure conditions into the mold configuration to form a composite which is mold releasable and possesses the desired properties of the component layers in a unitary structure. Fabrics in particular are susceptible to being adversely affected by bi-directional stretching, pressure and, in general, stress and strain developed during molding, and in particular sharp-angled molding operations. Additional problems arise in attempting to tailor a rigidifying substance for the fabric capable of proper adherence to the fabric during the molding operation without deleteriously affecting desired fabric properties and which will provide the necessary strength, dimensional stability and shape retention required in the molded composite.

It is therefore an object of the present invention to provide molded fabric laminates having the strength, rigidity and shape retention of high impact strength molded articles in combination with the highly desirable loft, feel, resilience and appearance of a fabric. It is another object of the invention to provide methods for molding laminated, durable, fabric-containing structures in which the individual laminae, including fabric and rigidifying means, simultaneously conform to a three-dimensional mold configuration having acute angles and slopes to produce strong composite articles precisely mirror-imaged to the mold. It is another object of the invention to provide methods for producing molded fabrics which do not exhibit noticeable design defects or surface deformations such as wrinkling due to poor flowability or stretchability of laminae during the molding operation. Other objects of the invention will appear obvious from the detailed description of the invention hereinafter.

In accordance with the present invention, it has now been found that molded fabrics having excellent rigidity, strength and overall shape retention may be prepared by pre-heating and cold molding a laminate comprised of an internal layer of batting, an upper layer of fabric having sufficient bi-directional elongation properties to conform to the shape of the mold and a bottom layer of a fused, low melting particulate thermoplastic. One aspect of the invention relates to a process of cold molding the laminated fabric in which an adherent low melting particulate thermoplastic is evenly applied to the under surface of the internal batting and then heated sufficiently to fuse the plastic particles into a melt which forms a coherent, rigidifying layer upon cooling. Thereafter, the laminate is pre-heated sufficiently to soften the thermoplastic layer into a limp, viscous, tacky mass and is cold molded into a strong, durable molded fabric.

DETAILED DESCRIPTION

Reference is now made to the drawing illustrating a typical cross-section of a molded fabric prepared according to the present invention wherein numeral 10 is a layer of fabric, e.g., woven or knitted, having sufficient bi-directional extensibility for molding operations adhesively bound to an internal non-woven mat 14 by means of adhesive material 12, and numeral 16 is a bottom layer of a coherent, rigid, high impact strength thermoplastic material.

The process of preparing the molded fabrics comprises adhesively plying an internal layer of one or more mats of batting material to a textile fabric conformable to mold configurations by multi-directional stretching operations without loss of strength, injury to knitted or woven structure, or being otherwise adversely affected in essential fabric characteristics; evenly applying to the other side of the batting a layer of particulate, low melting, fusible material adherable to the batting and transformable into a strong, rigid layer upon heating and subsequent cooling; preferentially heating the preform to melt the particulate thermo-plastic sufficiently to form a coherent tacky mass and molding the preform into a rigid fabric composite without additional heat input.

Referring to the drawing in greater detail, the internal non-woven layer 14 is composed as stated above of one or more non-woven mats which may be prepared according to techniques well known in the art, i.e., paper, wool, and cotton carding or by deposition from an air stream on a screen. The particular fibrous material employed in the non-woven layer is not critical to the invention and, for example, may be such materials as cotton, flax, wool, nylon, rayon, acetate, triacetate, polyester, polyamide, polyethylene, polypropylene, polyurethane, polyvinyl, acrylic and the like and mixtures thereof.

Generally, and preferably where resilience is an essential characteristic, the non-woven batting will be formed from crimped staple fibers ranging in length from about 0.75 to 4.5 inches and, preferably, about 1 to 2.0 inches, or a continuous filament tow which, for example, subsequent to crimping but prior to being spread into a non-woven web has been subjected to an initial opening operation to separate filaments and to deregister the crimps of adjacent filaments. Similarly, the denier of the individual structural filaments of the non-woven may vary widely. Typically, the component fibers will have a denier of between about 0.5 and 30 with deniers of the order of about 3 to 7 being preferred because of ease of handling and presence of increased dimensional stability and toughness in the final product. The non-woven batting may be held together by means of random mechanical interlocking of fibers, needling, fusion in the case of thermoplastic fibers and by impregnating a binder such as starch, glue, casein, rubber latex and various cementing thermoplastic resins, i.e., polyurethane latex, into the non-woven web. Preferably, the internal batting will consist of 5.5 denier acetate staple filament averaging about 1.5 inches in length needled to about 184 punches per square inch. In regard to density, it has been found that a batting having the preferred filament content as indicated herein ranging in density from about 1.5 ounces per square yard to 8 ounces per square yard, preferably about 2.75 to 4.5 ounces per square yard, and of an overall pre-molded thickness of about 1/16 to 3/8 inch, preferably about 1/8 to 1/4 inch, provides a good degree of loft, resilience and dimensional stability to the molded composite.

Essential to the present invention is that a textile fabric having sufficient multi-directional elongation with respect to the particular mold configuration be plied to one planar side of the batting material. The term "textile fabric" as used herein refers broadly to textile structures formed by a systematic interlacing of fibers regardless of technical classification as knitted, woven and the like, possessing the physical properties enabling it to conform to a three-dimensional mold configuration without loss of "fabric properties." By "fabric properties" is meant not only purely physical properties such as retention of a good degree of tenacity and abrasion resistance but also general fabric appearance and, most importantly, the ability to be cold molded without occurrence of planar surface deformation.

Thus, the choice of fabric material will depend largely upon the degree and direction of stretch required during the particular molding operation. In general, woven fabrics function better than knits when a low percentage of bi-directional stretch is required. On the other hand, if the pre-form is to be shaped into a configuration requiring a high ratio of bi-directional stretch in one direction or unilateral stretch, i.e., 5, 10, or even 50 or 100 to 1, a knitted fabric may be most suitable.

Of course, the fabric should be composed of fibers having an inherent stretch capacity sufficiently high to allow the fabric to conform to the mold without loss of fabric properties. Fibers and yarns particularly suitable are those which have been subjected to a texturing operation of one type or another or are partially drawn. It is not imperative that the fibers be of an elastic nature so as to return to their original lengths upon release, such as "Spandex" fibers, since the fabric will be permanently "set" in the stretched state. More important is the property of obtaining or retaining high tenacity in the elongated state which is typical of textured and underdrawn fibers. Therefore, the fiber content of the fabric material may be polyamide, polyester, acetate, triacetate, polypropylene, acrylic and the like and, preferably, is partially drawn or undrawn polyester.

Conventionally, thermoplastic yarns, such as polyester yarns, are marketed in a fully drawn configuration; that is, the yarns are drawn to their maximum tenacity for a preselected elongation before being employed in final manufacturing operations. With the employment of an underdrawn yarn, the molding operation with its accompanying fabric stretching will further draw the yarn forming a high strength fabric construction in the final composite.

For each partially drawn yarn there is a degree of draw which will develop optimal physical properties, such as strength, in the yarn. Thus, to develop maximum fabric strength in the molded composite, the fabric should be tailored for the particular molding operation. That is, the fabric should be formed of underdrawn yarn which will subsequently be drawn during the molding operation to obtain the degree of drawing which will produce optimum physical properties. Therefore, specific yarn properties need not be stated and will vary widely depending upon degree of stretching required. For example, partially drawn polyester having a denier of about 20 to 2000, preferably about 40 to 200, subjected to draw ratio reduction compared to drawing required for maximum molecular orientation into a fully drawn yarn of highest comparative strength, of about 2 to 75 and, preferably, 10 to 20 percent, will function satisfactorily when fabricated into knitted and woven fabrics according to the present invention. In certain of the preferred embodiments of the invention, as detailed in the examples hereinafter, the underdrawn polyester will be characterized by a relatively high elongation at break and relatively low tenacity. It has been found that for maximum stretchability in molded fabric operations, the polyester should possess an elongation at break of over 50%, and preferably about 80 to 125%, coupled with a tenacity below about 7.0, and preferably about 2.5 to 3.5. In a like manner, other partially drawn yarns such as nylon 6.6 may be substituted for the polyester with equally good results.

In order to form an integral, unitary laminate, the outer fabric should be firmly bound to the internal batting. This may be accomplished in various ways depending upon fabric and batting construction and fiber content. For instance, the batting and fabric layers may be heat fused, but this may tend to "set" certain thermoplastic fibers preventing adequate stretching during the molding operation and adversely affect other desired yarn properties such as strength and abrasion resistance. It is recommended that the two layers be adhesively attached at the interface by an extensible binder material. In the selection of an adhesive, it is important that the chosen material not only adequately adheres the fabric and batting laminae together but retains sufficient flexibility to avoid cracking and the like during the stress and strain which accompany the cold molding operation. Further, it is preferred that the adhesive does not extensively penetrate the batting and/or fabric as a whole or a substantial number of individual fibers, since it could thereby interfere with fiber stretchability and overly "mat" the batting. Thus, the term "adhesive" as employed herein and in the appended claim refers to numerous extensible adhesive materials, such as elastomeric materials, including polyisobutylene and low molecular weight polyethylene-polypropylene copolymers; maleic anhydride-olefin condensates; and polymeric plasticizers, particularly the phthalates such as di-methoxyethylphthalate.

Following lamination of the batting and fabric layers, the batting is back coated with a particulate thermoplastic to provide stiffness and impact strength to the molded product. The thermoplastic should be heat fusible into a coherent, rigidifying layer upon cooling which, while not substantially penetrating the batting so as to modify its loft and other fabric properties, possesses a degree of inherent adhesiveness to tightly adhere to the batting to form a unitary article upon cold molding. Of course the thermoplastic may penetrate somewhat into the batting layer if a higher degree of stiffness in the molded article is desired.

Considering the particulate thermoplastic in greater detail, numerous low melting resins fusible into a coherent sheet upon cooling may be employed. An essential characteristic in addition to the above is that the thermoplastic melt at a temperature below that which would adversely affect the fiber layers of the laminate, e.g. below the softening temperature of thermoplastic fibers. Thus, the description "low melting" is a relative term referring to temperatures which may fluctuate widely depending upon specific fabric and batting fiber components. As examples of suitable low melting thermoplastics useable with essentially all man-made and natural fibers there may be mentioned particulate polyurethanes, polyvinylchlorides, polyvinylfluorides and polyolefins, particularly polyethylenes and polypropylenes. Although mesh size, melt index and density of resin powder may vary over a wide range, certain guidelines may be stated to aid in the selection of particularly suitable stiffening agents. With respect to particle size, mesh size of applicable resins as determined by the finest U.S. Standard Sieve through which more than 95% of the powder will pass, may range from about 5 mesh to powders finer than 325 mesh sieve, e.g., 8 to 30 micron particles. Superior results are achieved with powders within the range of about 15 to 25 mesh and preferably about 20 mesh because of their excellent formability in cold molding operations. Further, it has been determined that a resin's melt index and density affect in a predetermined manner certain of the laminate's physical properties such as impact strength, stiffness, resistance to low temperature brittleness and the like. As a generalization which, of course, is subject to exceptions, an increase in melt index causes a corresponding increase in polymer flow but adversely decreases the end product's impact strength and resistance to low temperature brittleness. On the other hand, with the use of a polymer having a higher density, stiffness is increased but as with melt index, there is a proportionate loss of toughness in the final product. For example, while polyolefins may be employed having a melt index (g./10 min.) ranging from about 1.0 to 70 and a density (g./cc.) ranging from about 0.90 to 0.97, it would be preferred that medium to low density material having a relatively low melt index be employed to supply adequate stiffness to the final product without adversely affecting its strength e.g., melt index of about 20 and density of about 0.93.

The amount of particulate thermoplastic applied as the back coating will depend most importantly upon the end use of the molded fabric. If the molded fabric will be subjected to considerable stress and strain during use, a higher add-on of powder would be required during which the thermoplastic may be allowed to impregnate the batting so as to solidify within interstitial spaces near the undersurface of the batting. It is preferred to apply the thermoplastic during one coating operation although two or more applications may be used where desired.

The molded composite of the present invention is particularly suitable for use in articles of manufacture requiring an insertable interior liner of precise configuration possessing high impact strength in conjunction with loft and appearance of a fabric, such as suitcases, caskets, briefcases, portable instrument carrying cases and the like. In such instance, the molded liner may be permanently inserted into its casing in any of a number of ways obvious to those of skill in the art, e.g., clamped, adhesively bound, inserted below restraining ridges and the like.

The following examples are presented to illustrate certain embodiments of the invention and are not to be construed as limiting the scope of the invention as defined by the appended claims.

EXAMPLE I

In accordance with the present invention, a 4 ounce per square yard batting needled one time at 184 punches per square inch formed of crimped acetate staple having an average denier of 5.5 and length of 1 9/16 inches is hot embossed to a 55 denier acetate tricot using dimethoxyethyl-phthalate adhesive. The adhesive is applied to the batting in the form of a spray at a rate of 10 percent add-on; that is, the weight of the nonwoven batting is increased 10 weight percent. The embossed sandwich is then back coated with 11 ounces per square yard of 20 mesh polyethylene having a melt index of 22 and a density of 0.929 available from United States Industrial Chemical Company. Following polyethylene application, the sandwich is placed under an infrared heater with the polyethylene facing the heater until the polyethylene coalesces into a unitary viscous mass. After cooling, the laminate is cut to mold size and pre-heated in a Comet model shop mold with 80 percent of the heat directed to the polyethylene-coated side until the polyethylene begins to melt. Immediately thereafter, the preform is vacuum molded utilizing a cold male plug for 20 seconds into a thin rectangular suitcase liner with the tricot stretch direction parallel to the longer mold dimension. The liner is a tough, rigid composite having the loft, hand, and overall appearance of a fabric.

The liner produced in accordance with Example I is fixedly inserted into a suitcase having an internal lower cavity corresponding to that of the vacuum mold by means of a rigid restraining "snap-in" rectangular frame which fits securely around the internal cavity of the suitcase above the liner.

EXAMPLE II

Example I is repeated except that the sandwich is extrusion back-coated with a film formed from the identical polyethylene. Upon cooling the polyethylene film shrinks inwardly toward the center of the face of the batting causing a buckling of the sandwich which is not eliminated during subsequent preheating and molding.

This example illustrates the importance of powder back coating and fusion thereof to form the coherent backing to produce a molded fabric without surface deformity.

EXAMPLE III (a)

Example 1 is repeated substituting a 6 ounce per square yard nylon tricot constructed from 40/13 nylon quilted to a 2.75 ounce per square yard polyester batting needled once at 184 punches per square inch for the fabric-batting of Example I.

The polyester batting is composed of 75 percent polyester binder fiber having a softening temperature of approximately 165° F. and 25 percent regular polyester.

(b)

Part (a) of this example is repeated with a 2.75 ounce per square yard acetate batting as described in Example I sandwiched between the tricot and polyester batt.

In both parts of this example the molded laminate has excellent shape retention and dimensional stability. The product of part (b) is particularly suitable for end uses requiring a high degree of resilience and loft.

EXAMPLE IV

A fabric is circular knit from underdrawn polyester yarn having the characteristics stated below and adhesively bound to a batting as described in Example I. Following back-coating wth 10 ounces per square yard of the polyethylene used in Example I, the laminate is heated to fuse the thermoplastic, cut to mold clamp size, preheated and cold molded. The mold selected is essentially cubical in shape requiring substantial bi-directional stretchability. The molded composite exhibits no surface deformities and has excellent strength, loft and hand.

The polyester yarn has the following characteristics (a)

| | |
|---|---|
| Denier | 99.7 |
| Tenacity (grams per denier) | 3.01 |
| Elongation at break (percent) | 110.8 |
| Draw ratio | 2.27 |

(b) Part (a) is repeated with a fabric knitted from partially drawn polyester yarn of the following characteristics with equally good results

| | |
|---|---|
| Denier | 99.9 |
| Tenacity (grams per denier) | 2.98 |
| Elongation at break (percent) | 100.8 |
| Draw ratio | 2.27 |

(c) Part (a) is repeated with a fabric knitted from partially drawn polyester yarn of the following characteristics with equally good results

| | |
|---|---|
| Denier | 60 |
| Tenacity (grams per denier) | 3.1 |
| Elongation at break (percent) | 95 |
| Draw ratio | 2.27 |

(d) Part (a) is repeated with the tricot in Example I. Because of the inherent lack of substantial bi-directional stretchability of the conventional tricot fabric, the laminate will not conform to the mold shape without wrinkling. This example illustrates the principles of the present invention and, further demonstrates the importance of tailoring the fabric to the molding operation, e.g. while conventional tricots are adequate when a relatively high percentage of uni-directional or a relatively large ratio of bi-directional stretch is required, they will not mold satisfactorily in cavities requiring substantial bi-directional stretch in both directions unless knitted from partially drawn yarns, or in some other manner are given a high degree of bi-directional extensibility.

Circular knits, flat knits and woven fabrics formed from underdrawn polyester give equally good results when employed in the present invention.

The above examples illustrate the highly advantageous benefits flowing from the present invention in the molding of rigid, strong, fabric articles in shapes requiring the laminate to conform perfectly to mold configurations having sharp surface angles such as 90 degree angles as in the case of suitcase liners, and steep sloping curvatures.

Although in its broadest forms the present invention is applicable to continuous fabric molding operations, equipment and process limitations presently existing in the fabric molding art limit its practical use to essentially sequential, discontinuous operation. That is, with the availability of adequate assembly-line molding techniques and equipment, certain of the process steps as described in the examples hereinbefore may be omitted. In particular, once the low melting rigidifiable thermoplastic has been applied to the underside of the batting and heated to fusion temperature, the composite can be cooled slightly and immediately introduced into a vacuum mold with cutting accomplished by automated equipment during the molding step or thereafter. However, with molding systems generally employed in the industry, fabric must be pre-cut and manually clamped along the periphery of the vacuum mold prior to introduction of the mated die. Therefore, it is to be understood that the present invention is not to be limited to the specific embodiments described herein but is intended to encompass all modifications, such as those indicated above, and others which will be readily apparent to those of ordinary skill in the art, e.g., the fabric layer may be hot embossed or quilted for styling effects. Therefore, the invention is to be constructed broadly, according to the appended claim in view of the specification.

What is claimed is:

1. A process for forming molded fabrics comprising:
    (a) adhering to a batting a fabric having sufficient bi-directional stretchability to conform to the mold cavity;
    (b) applying a layer of adherent, particulate, low melting thermoplastic to the other side of the batting, said layer formable into a shape retaining coherent layer upon fusion and solidification;
    (c) heating the pre-form so produced to fuse the thermoplastic;
    (d) molding the pre-form while the thermoplastic is initially in the fused state; and
    (e) removing the molded laminate from the mold following substantial solidification of the thermoplastic.

References Cited

UNITED STATES PATENTS

| 2,957,512 | 10/1960 | Wade et al. | 161—148 |
| 3,219,507 | 11/1965 | Penman | 161—67 |
| 3,211,600 | 10/1965 | Motycka | 161—67 |
| 2,791,529 | 5/1957 | Converse | 156—280 |

WILLIAM A. POWELL, Primary Examiner

J. J. BELL, Assistant Examiner

U.S. Cl. X.R.

156—279, 280; 161—89, 156; 264—134, 257